United States Patent
Abdollahpouri et al.

(10) Patent No.: US 12,084,067 B2
(45) Date of Patent: Sep. 10, 2024

(54) COMPUTER IMPLEMENTED METHOD FOR CONTROLLING A VEHICLE

(71) Applicant: VOLVO TRUCK CORPORATION, Gothenburg (SE)

(72) Inventors: Mohammad Abdollahpouri, Partille (SE); Johan Axelsson, Landvetter (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/660,522

(22) Filed: Apr. 25, 2022

(65) Prior Publication Data
US 2022/0363270 A1 Nov. 17, 2022

(30) Foreign Application Priority Data
May 5, 2021 (EP) ..................................... 21172305

(51) Int. Cl.
*B60W 40/13* (2012.01)
*B60W 40/064* (2012.01)

(52) U.S. Cl.
CPC .......... *B60W 40/13* (2013.01); *B60W 40/064* (2013.01); *B60W 2040/1323* (2013.01); *B60W 2520/10* (2013.01); *B60W 2552/20* (2020.02)

(58) Field of Classification Search
CPC ............... B60W 40/13; B60W 40/064; B60W 2552/20; B60W 2040/1323; B60W 2520/10
See application file for complete search history.

(56) References Cited

U.S. PATENT DOCUMENTS 6,535,114 B1 * 3/2003 Suzuki ...................... G06T 7/70
 348/148
10,654,551 B1 * 5/2020 Doremus ................ B63B 1/246
(Continued)

FOREIGN PATENT DOCUMENTS

CN 108944935 A 12/2018
CN 110032711 A 7/2019
(Continued)

OTHER PUBLICATIONS

European Search Report dated Nov. 2, 2021 in corresponding European Patent Application No. 21172305.1, 5 pages.

*Primary Examiner* — Yazan A Soofi
*Assistant Examiner* — Naeem Taslim Alam
(74) *Attorney, Agent, or Firm* — Venable LLP; Jeffri A. Kaminski

(57) ABSTRACT

A computer implemented method for controlling a vehicle includes obtaining a value of the mass of the vehicle, receiving a plurality of time sequential measured first values of one or more further state parameters, calculating a first plurality of time sequential values of the vehicle mass, including a first calculated mass value, using the plurality of measured first values of the one or more further state parameters, the non-linear model, and an extended Kalman filter with a first filter tuning, with the obtained mass value as a start value, receiving a plurality of time sequential measured second values of the one or more of the further state parameters, and calculating a second plurality of time sequential values of the vehicle mass, including a second calculated mass value, using the plurality of measured second values of the one or more further state parameters, the non-linear model, and an extended Kalman filter with a second filter tuning, with the first calculated mass value as (Continued)

a start value, wherein the second filter tuning is made less aggressive than the first filter tuning.

15 Claims, 5 Drawing Sheets

(56) References Cited

U.S. PATENT DOCUMENTS

| | | |
|---|---|---|
| 2011/0066322 A1 | 3/2011 | Karlsson et al. |
| 2015/0149046 A1 | 5/2015 | Jeong |
| 2016/0082964 A1* | 3/2016 | Chunodkar ........... B60W 40/13 701/70 |
| 2019/0226905 A1* | 7/2019 | Di Domenico ...... G01G 19/086 |
| 2020/0232842 A1* | 7/2020 | Huang ................ B60W 30/143 |

FOREIGN PATENT DOCUMENTS

| | | |
|---|---|---|
| WO | 2014149042 A1 | 9/2014 |
| WO | 2019175103 A1 | 9/2019 |

* cited by examiner

COMPUTER IMPLEMENTED METHOD FOR CONTROLLING A VEHICLE

TECHNICAL FIELD

The invention relates to a computer implemented method for controlling a vehicle, a computer program, a computer readable medium, a control unit or a group of control units, and a vehicle.

The invention can be applied to heavy-duty vehicles, such as trucks and buses. Although the invention will be described with respect to trucks, the invention is not restricted to this particular type of vehicle, but may also be used in other vehicle types such as delivery vans and cars.

BACKGROUND

For vehicles, in particular heavy-duty vehicles, the mass of the vehicle may be an important parameter for many functions in the control of the vehicle. An incorrect mass estimation may cause such functions to provide a suboptimal control of the vehicle. This in turn may increase the vehicle operating costs, such as fuel consumption. In addition, in vehicles where the payload varies significantly with time, such as in trucks, the estimation of the vehicle mass creates particular challenges.

For example, a truck without any trailer may have a mass of around 8 tons. This tractor mass may not change significantly during the operation of the truck. However, the change in operations between tractor only operations and operations with one or more trailers means that the mass may vary between a few tons and 50, 150, or even 300 tons.

For the mass estimation, a Kalman filter may be used. As is known, Kalman filtering uses a series of measurements observed over time, and produces an estimate that tend to be more accurate than an estimate based on a single measurement alone.

US20110066322A1 describes vehicle mass estimation with the use of an extended Kalman filter (EKF), given a non-linear discrete time model. However, a problem is that this method is a locally convergent estimation method. This means that by providing an initial assumption of the mass, which is relatively far from the true mass, may result in an estimation that is also relatively far from the true mass, or a correct estimation which takes a very long time to obtain, (e.g. may hours of driving). This is a particular problem for trucks, since the mass variations of trucks are likely to create initial mass assumptions which substantially deviates from the true mass.

SUMMARY

It is an object of the invention is to improve vehicle controls. It is also an object of the invention is to provide improved vehicle controls by providing a fast and accurate vehicle mass estimation.

The objects are reached with a method according to claim 1. Thus, the objects are reached with a computer implemented method for controlling a vehicle, said control being performed by use of a non-linear model representing dynamics of the vehicle, the non-linear model giving a relationship between a plurality of vehicle state parameters, the vehicle state parameters including the mass of the vehicle and one or more further state parameters. The method comprises:
obtaining a value of the mass of the vehicle,
receiving a plurality of time sequential measured first values of one or more of the further state parameters,
calculating a first plurality of time sequential values of the vehicle mass, including a first calculated mass value, using the plurality of measured first values of the one or more further state parameters, the non-linear model, and an extended Kalman filter with a first filter tuning, with the obtained mass value as a start value,
receiving a plurality of time sequential measured second values of the one or more of the further state parameters, and
calculating a second plurality of time sequential values of the vehicle mass, including a second calculated mass value, using the plurality of measured second values of the one or more further state parameters, the non-linear model, and an extended Kalman filter with a second filter tuning, with the first calculated mass value as a start value.

The second filter tuning is made less aggressive than the first filter tuning.

The method further comprises using the second calculated mass value in the control of the vehicle.

The vehicle may be of any ground vehicle type, or road vehicle type, e.g. a heavy-duty vehicle, such as a truck or bus, or another type of vehicle, such as a delivery van or a car. The vehicle may have any suitable type of drivetrain. For example, the drivetrain may include an internal combustion engine as the sole propulsive device, the drivetrain may be a hybrid drivetrain, or the drivetrain may include an electric motor as the sole propulsive device. The vehicle may include a battery pack or a fuel cell for the propulsive device.

The step of obtaining a value of the mass of the vehicle, may be done by assuming the vehicle mass value. Assuming the value of the mass of the vehicle, may for example be done in dependence on signals from one or more sensors arranged to detect the load on wheel suspensions of the vehicle. Such one or more sensors may for example be arranged to detect the pressure in an air suspension system of the vehicle. In cases where one or more, but not all, of the axles of the vehicle is provided with air suspension, the vehicle mass value may be assumed in dependence on the sensor signals, and an assumption on a mass distribution of the vehicle. In some cases, the step of assuming a value of the mass of the vehicle, may be done in dependence on data on the torque of a propulsion system of the vehicle, and data on the inclination of a road on which the vehicle is travelling.

In some embodiments, the step of obtaining a value of the mass of the vehicle, may be done by a preceding calculation. For example, the method may comprise, before the step of receiving the plurality of measured first further state parameter values, calculating a preceding plurality of time sequential values of the vehicle mass, including the obtained mass value, using a plurality of precedingly measured first values of the one or more further state parameters, the non-linear model, and an extended Kalman filter with a preceding filter tuning, with a preceding mass value as a start value.

The first filter tuning may be a relatively aggressive filter tuning. The second filter tuning may be a relatively soft filter tuning. Thus, two different filter tunings are used for the mass estimation. Below are examples of how the filter may be adjusted. The aggressive filter tuning may give a relatively large degree of fluctuations of the mass estimation. However, the aggressive filter tuning may get relatively close to the true mass value in a relatively short time. Thereby, the aggressive filter tuning may get the estimated value close enough to the true value, so as for the soft filter tuning to take over. Thereby, an accurate estimation may be provided by the soft filter tuning. Also, the estimated values having been brought relatively close to the true value by the first filter tuning, the second, soft filter tuning may reach the true value in a relatively short length of time. In addition, the estimated values having been brought relatively close to the true value by the first filter tuning, reduces the risk of the second filter tuning resulting in the estimated values to converge to an incorrect value.

Thereby, a fast and accurate vehicle mass estimation may be provided. Thereby, vehicle control methods may be improved. For example, where the vehicle comprises an internal combustion engine for its propulsion, drivetrain gear selections and gearshift timings are usually made in dependence on estimations of vehicle mass. The quickly established accurate mass estimation, provided by embodiments of the invention, may increase the amount of gear selections and gearshift timings that are optimized for minimizing the fuel consumption. This may ensure a high fuel efficiency. The invention may also allow a fast adaption to a driving strategy that minimizes the use of service brakes of the vehicle. Thereby, service brake wear may be reduced. The quickly established accurate mass estimation may also allow a fast adaption to a driving strategy taking into consideration a state of health of an electric storage device, such as a battery, or a battery pack. The invention further allows a fast adaption to a driving strategy that minimizes any other degradation of the vehicle. The fast driving strategy adaption is also beneficial to the drivability of the vehicle. Specifically, a quickly reached accurate gear shifting strategy will improve the driving experience of a driver of the vehicle.

It should be noted that, where the step of obtaining a vehicle mass value is done by assuming a vehicle mass value, the second calculated mass value may be used to determine the accuracy of any sensor data used for the initial vehicle mass value assumption. If the second calculated mass value is close to the initial vehicle mass value assumption, the sensor data may be accepted as correct. If the second calculated mass value is not close to the initial vehicle mass value assumption, the second calculated mass value may be used as the vehicle mass value in the vehicle control.

Preferably, the non-linear model represents the longitudinal dynamics of the vehicle, wherein the method comprises using the second estimated mass value in a longitudinal control of the vehicle. Thus, in embodiments of the invention, a model for longitudinal movements of the vehicle may be used. Thereby, the mass estimation may be particularly useful for increasing the fuel efficiency of trucks.

One or more further state parameters may include one or more of the velocity of the vehicle, an air resistance coefficient, a rolling resistance coefficient, and an inclination of a road on which the vehicle is travelling. Thereby, parameters particularly useful for the mass estimation may be used. In particular, embodiments of the invention may give an accurate estimate on the road inclination. This may be used to check the accuracy of an inclination sensor of the vehicle. As exemplified below, where the inclination estimation differs from the inclination sensor indication, the estimation may be used to add an offset, herein also referred to as a road inclination measurement adjustment, to the sensor indication. Thereby, an accurate road inclination data may be given by the sensor indication and the offset.

In embodiments of the invention, the dynamics of the vehicle, may be described by the following nonlinear equation:

$$m\frac{dv}{dt} = F - c_{atr}v^2 - mgc_r - mg\alpha \quad (1)$$

where F is the total force on the wheels, g is the gravitational acceleration, m is the vehicle mass, v is the vehicle velocity, dv/dt represents the time derivate of the velocity, i.e. the vehicle acceleration, cair is the air-resistance coefficient, cr is the roll-resistance coefficient, and a is the road grade, i.e. the road inclination. For estimating the vehicle mass using such a non-linear equation, the extended Kalman filter (EKF) is used. The extended Kalman filter may be used as described in "Extended Kalman Filter Tutorial", Gabriel A. Terejanu, Department of Computer Science and Engineering, University at Buffalo, Buffalo, NY 14260, incorporated herein by reference.

The tuning of the Kalman filter, to be soft or aggressive, may depend on tuning parameters, such as the state uncertainties covariance and/or the measurement noise variance (s), as exemplified below.

Preferably, the model comprises a state uncertainty for each of the state parameters, and a covariance of the state uncertainties, wherein making the second filter tuning less aggressive than the first filter tuning comprises making the state uncertainties covariance in the second filter tuning differ from the state uncertainties covariance in the first filter tuning. Thereby, a manner of changing from the first to the second filter tuning, that is easy to implement, is provided.

For example, equation (1) above may be formulated in a discrete time domain as follows:

$$v_{k+1} = v_k + T_g\left(\frac{1}{m_k}(F_k - c_{atr_k}v_k^2) - gc_{r_k} - g(\alpha_k + \alpha_{b_k})\right) + w_1 \quad (1a)$$

$$m_{k+1} = m_k + w_2 \quad (1b)$$

$$c_{r_{k+1}} = c_{r_k} + w_3 \quad (1c)$$

$$c_{atr_{k+1}} = c_{atr_k} + w_4 \quad (1d)$$

$$\alpha_{b_{k+1}} = \alpha_{b_k} + w_5 \quad (1e)$$

Such a formulation in the discrete time domain is suitable for the estimation framework of the extended Kalman filter. Thereby, w1, w2, w3, w4, and w5 each represents a state uncertainty for the respective the state parameter. The state uncertainties may jointly represent the so-called model uncertainty. The covariance of the state uncertainties may form a covariance matrix. Thereby, the switch from the first filter tuning to the second filter tuning may comprise changing the state uncertainties covariance matrix.

In the example with equations 1a-1e above, the covariance matrix of the state uncertainties w1-w5 may be a matrix with five columns and five rows. In some embodiments, one or more of only five elements of a diagonal of the matrix are adjusted for the switch from the first filter tuning to the second filter tuning.

It is understood that embodiments of the invention provide, in addition to vehicle mass estimations, simultaneous estimations of the further state parameters, such as the roll-resistance, air-resistance and/or the road inclination. As suggested, the road inclination estimation may be used to provide a road inclination offset, to be used as a value to be added to a measured road inclination, e.g. by an inclination sensor. Thereby, the vehicle control may be made more robust. For example, the road inclination offset may create more stable estimation results for other parameters. Alternatively, or in addition, estimations of the road inclination provided by embodiments of the invention, may be used to monitor for any fault in a road inclination sensor of the vehicle.

Preferably, the model comprises a measurement function which adjusts the measured first and second values of the one or more of the further state parameters, based on a value of a respective measurement noise and a variance of the respective measurement noise. Thereby, making the second filter tuning less aggressive than the first filter tuning may comprise making the variance of the measurement noise in the second tuning differ from the variance of the measurement noise in the first tuning. Thereby, a further manner of changing from the first to the second filter tuning, that is easy to implement, is provided.

For example, where the vehicle velocity is measured, the measurement function may adjust the measured values of the velocity, based on a value of a velocity measurement noise and a variance of the velocity measurement noise. Specifically, such an adjustment may be made where only the vehicle velocity is measured. The function may be expressed as $$y_{kv} = v_k + \mu_{kv} \quad (2a)$$

in a discrete time domain, where $\mu kv$ is the velocity measurement noise. Thereby, the variance of the velocity measurement noise may differ in the first and second filter tunings.

In addition, where the road inclination is measured, e.g. where only the road inclination is measured, the measurement function may adjust the measured values of the road inclination, based on a value of a road inclination measurement noise and a variance of the road inclination measurement noise. For example, the adjusted measured first and second values of the one or more of the further state parameters may include first and second values of an inclination of a road on which the vehicle is travelling.

In some embodiments, the further vehicle state parameters include a road inclination measurement adjustment which is an adjustment of a measurement of an inclination of a road on which the vehicle is travelling. The method may thereby comprise obtaining, e.g. by assuming, a value of the road inclination measurement adjustment, and calculating a first plurality of time sequential values of the road inclination measurement adjustment, including a first calculated road inclination measurement adjustment value, using the plurality of measured first values of the one or more further state parameters, the non-linear model, and the extended Kalman filter with the first filter tuning, with the obtained road inclination measurement adjustment value as a start value. The method may further comprise calculating a second plurality of time sequential values of the road inclination measurement adjustment, including a second calculated road inclination measurement adjustment value, using the plurality of measured second values of the one or more further state parameters, the non-linear model, and the extended Kalman filter with the second filter tuning, with the first calculated road inclination measurement adjustment value as a start value. The second calculated road inclination measurement adjustment value may be used in the control of the vehicle.

As also suggested below, the second calculated road inclination measurement adjustment value may be used to adjust measurements of the road inclination. Thereby, incorrect road inclination measurements may be corrected. This will improve the vehicle mass estimation. This will also improve the control of the vehicle.

Also, in some embodiments, the road inclination may be considered in the model as time varying. Thereby, the road inclination may be used in the model without being utilized in the measurement function. Therefore, the variance of the measured road inclination can be ignored. Thereby, the road inclination measurement adjustment value may be an unknown state. This will reduce the complexity of the mass estimation. Nevertheless, in such embodiments, a covariance matrix of state uncertainties for the state parameters may depend on the road inclination.

The setting of the Kalman filter, to provide the aggressive and the soft tuning may be done in dependence on testing. For example, the method may comprise storing data from mass estimation processes of historic vehicle operations. Such data may be stored accessible to a control unit used for estimating the mass of the vehicle in question. The first and second filters tunings may be provided in dependence on such stored data.

The stored data may be categorised for different cases. For example, data from vehicles provided with the same type of engine as the vehicle, the mass of which is to be estimated, may be used. Further, for setting the first and second filters tunings, the vehicle configuration of the vehicle may be determined. The configurations may include a tractor with no trailer, and a tractor with a semitrailer. A user, e.g. a driver of the vehicle, may enter the vehicle configuration by means of a user interface, e.g. a touch display in a driving compartment of the vehicle. Thereby, data from historic operations of vehicles with the same vehicle configuration as the vehicle in question may be used for setting the first and second filters tunings.

In some embodiments, the first filter tuning and/or the second filter tuning may be determined in dependence on the results of a plurality of filter tunings. For example, the filter tunings may mutually have different tuning parameter values. The tuning parameter values may be selected based on stored data from historic vehicle operations and/or randomly.

More specifically, the first filter tuning may be selected from trials of mass estimations with filter tunings of the plurality of filter tunings. Thereby, a minimum value of a standard deviation of the mass estimations may serve as a criterium for selecting the first filter tuning from the plurality of filter tunings. For example, the mass of the vehicle without a trailer, and possibly the mass of the vehicle with a trailer and a maximum load, may be known at least approximately. The mass estimations minimum standard deviation may be set to a suitable value in relation to at least one of these known mass values, e.g. to half the mass of the vehicle without a trailer. Further, a mass estimations maximum standard deviation may be set to a suitable value in relation to at least one of these known mass values. The first filter tuning may be selected as a filter tuning, from the plurality of filter tunings, giving a mass estimations standard deviation above the mass estimations minimum standard deviation, and optionally below the mass estimations maximum standard deviation.

The same selection process can be used for the second filter tuning. Thereby, a maximum value of the standard deviation of the mass estimations may serve as a criterium for selecting the second filter tuning from the plurality of filter tunings.

Of course, for setting the first and/or send filter tunings, instead of the mass estimations standard deviation, a mass estimations variance of the tested plurality of filter tunings may be used.

As suggested, the first filter tuning and/or the second filter tuning may be determined in dependence on the results of a plurality of filter tunings. Where the model comprises a state uncertainty for each of the state parameters, and a covariance of the state uncertainties, the covariance may be different from one filter tuning to another. Specifically, the covariance may be different from one first filter tuning to another first filter tuning and/or the covariance may be different from one second filter tuning to another second filter tuning. Thereby, the first and second filter tunings may be selected from respective groups of filter tunings, such that the second filter tuning is less aggressive than the first filter tuning.

Where a state parameter is measured, a resolution of a sensor from a sensor manufacturer, for measuring the state parameter, may be used as an initial assumption of the variance of the sensor measurement noise. In addition, such a sensor resolution may be used in an initial assumption of an element in a covariance of the state uncertainties.

It should be noted that in some embodiments, the non-linear model may also represent the lateral dynamics of the vehicle, wherein the method comprises using the second estimated mass value in a lateral control of the vehicle.

Preferably, the method comprises determining a value of a calculation performance index indicative of the accuracy of one or more of the values in the first plurality of calculated values of the vehicle mass, and performing a change, from the use of the extended Kalman filter with the first filter tuning, to the use of the extended Kalman filter with the second tuning, in dependence on the calculation performance index value. Thereby, the performance index may include the variance of a plurality of the values in the first plurality of calculated values of the vehicle mass. The performance index value may be compared to an index threshold value, and the Kalman filter change may be performed in dependence on the comparison. The dependence of the performance index value on a value in the first plurality of calculated values of the vehicle mass may be dependent on the age of the value in the first plurality of calculated values.

Thus, the performance index could serve as a condition for the change to the soft Kalman filter tuning. Advantageously, the performance index is, or is dependent on, the variance of the first plurality of time sequential values of the vehicle mass. Further, the performance index may consider the variation of the mass in dependence in a "forgetting factor". For example, the older a mass estimation is, the less value it has for the further estimations.

Thereby, the performance index value determination may be done based on less than all of the values in the first plurality of calculated values of the vehicle mass, wherein values, in the first plurality of calculated values, which are older than an age threshold, are excluded from the performance index value determination. Alternatively, or in addition, the mass estimations may, in dependence on their respective age, have a gradually decreasing weight in the performance index determination.

Thereby, according to tests involving the travelling of a real vehicle, a fluctuating behavior of the mass estimation may be decreased. As the performance index decreases and comes below the index threshold value, the switch to the soft filter tuning may take place.

For example, said performance index may be implemented with a Recursive Least Square algorithm. The performance index may be expressed as a variance of the time sequential values of the vehicle mass according to the following equation:

$$PI(k) = \Sigma_{k=0}^{k0} \gamma e^{-\beta k} m(k) - m(k-1) \quad (3)$$

This performance index can be calculated at any time instance k0. The performance index is dependent on a forgetting factor, represented by $\gamma$ and $\beta$. This forgetting factor allows for the performance index to ignore any rough estimation behavior in the beginning of the step of calculating the first plurality of time sequential values of the vehicle mass. Thereby, a higher confidence is given to the estimated mass at the switch to the second filter tuning, compared to the estimated mass at the start of the estimation process.

In some embodiments, the vehicle is a heavy duty vehicle. Thereby, the invention is put to a particularly beneficial use, since, as suggested, the payload of a heavy duty vehicle, and therefore its mass, may vary significantly. According to the truck classification of the United States Federal Highway Administration (FHWA), a heavy duty vehicle is a vehicle which has a gross vehicle weight rating (GVWR) exceeding 26000 lb. It should be noted that the vehicle could be a tractor, a trailer tractor combination, or a single-unit dump truck. Nevertheless, the invention is applicable also to a light duty, or a medium duty vehicle.

Once the mass of the vehicle has been estimated, this estimated mass may be used in the control of the vehicle. There might not be any need to execute an embodiment of the invention again, until a substantial change of the vehicle mass has occurred, e.g. due to a loading, or unloading event of the vehicle. Embodiments of the invention may include detecting a mass change event. This may be done e.g. by detecting a substantial change in the vehicle suspension load, or the tire pressure. Alternatively, or in addition, the mass change event may be detected by a sensor indicating whether or not a trailer is connected to the tractor of the vehicle. Alternatively, or in addition, the mass change event may be detected by an input by a user, e.g. a driver of the vehicle, in a user interface device. Upon detecting a mass change event, the method according to an embodiment of the invention may be used again to estimate the vehicle mass after the event.

An aspect of the invention provides improved vehicle controls by providing a fast and accurate road inclination estimation. The aspect involves a computer implemented method for controlling a vehicle, said control being performed by use of a non-linear model representing dynamics of the vehicle, the non-linear model giving a relationship between a plurality of vehicle state parameters, the vehicle state parameters including a road inclination measurement adjustment which is an adjustment of a measurement of an inclination of a road on which the vehicle is travelling, and one or more further state parameters, the method comprising:

obtaining a value of the road inclination measurement adjustment, receiving a plurality of time sequential measured first values of one or more of the state parameters, calculating a first plurality of time sequential values of the road inclination measurement adjustment, including a first calculated road inclination measurement adjustment value, using the plurality of measured first values of the one or more further state parameters, the non-linear model, and an extended Kalman filter with a first filter tuning, with the obtained road inclination measurement adjustment value as a start value, receiving a plurality of time sequential measured second values of the one or more of the further state parameters, and calculating a second plurality of time sequential values of the road inclination measurement adjustment, including a second calculated road inclination measurement adjustment value, using the plurality of measured second values of the one or more further state parameters, the non-linear model, and an extended Kalman filter with a second filter tuning, with the first calculated road inclination measurement adjustment value as a start value, wherein the second filter tuning is made less aggressive than the first filter tuning, the method further comprising using the second calculated road inclination measurement adjustment value in the control of the vehicle.

Thereby, the second calculated road inclination measurement adjustment value may be used to adjust measurements of the road inclination. Thereby, incorrect road inclination measurements may be corrected. This will improve the control of the vehicle. The road inclination may be measured by means of one or more inclination sensors of the vehicle. The second calculated road inclination measurement adjustment value can be used to monitor such sensor(s) for faults therein.

The one or more further state parameters may include a road inclination which is the inclination of the road on which the vehicle is travelling. Thereby receiving a plurality of time sequential measured values of one or more of the state parameters, may include receiving a plurality of time sequential measured values of the road inclination. Also, thereby, receiving a plurality of time sequential measured second values of the one or more of the further state parameters, may include receiving a plurality of time sequential measured values of the road inclination.

The step of obtaining a value of the road inclination measurement adjustment, may be done by assuming the road inclination measurement adjustment value. Thereby, this assumed value may be a start value for the road inclination measurement adjustment. For example, the assumed road inclination measurement adjustment value may be zero. Alternatively, the assumed road inclination measurement adjustment value may be a value stored in a memory of a control unit for controlling the vehicle.

In some embodiments, the step of obtaining a value of the road inclination measurement adjustment, may be done by a preceding calculation. For example, the method may comprise, before the step of receiving the plurality of measured first state parameter values, calculating a preceding plurality of time sequential values of the road inclination measurement adjustment, including the obtained road inclination measurement adjustment value, using a plurality of precedingly measured first values of the one or more state parameters, the non-linear model, and an extended Kalman filter with a preceding filter tuning, with a preceding road inclination measurement adjustment value as a start value.

The method may comprise obtaining or establishing a value of the mass of the vehicle by determining, or assuming a value of the vehicle mass.

The vehicle mass may be one of the further vehicle state parameters, albeit not necessarily measured. Where the vehicle mass value is assumed, the method may comprise calculating a first plurality of time sequential values of the vehicle mass, including a first calculated mass value, using the plurality of measured first values of the one or more further state parameters, the non-linear model, and the extended Kalman filter with the first filter tuning, with the obtained, e.g. assumed, mass value as a start value. The method may further comprise calculating a second plurality of time sequential values of the vehicle mass, including a second calculated mass value, using the plurality of measured second values of the one or more further state parameters, the non-linear model, and the extended Kalman filter with the second filter tuning, with the first calculated mass value as a start value.

However, in some embodiments, the vehicle mass may be determined. Thereby, the vehicle mass may be determined without the use of the extended Kalman filter. For example, in the case of a semitrailer tractor travelling without the trailer, the mass of the vehicle may be known, e.g. from manufacturer's data. Thus, the vehicle mass may be determined by receiving data indicative of the vehicle mass. Thereby, the road inclination measurement adjustment value can be determined with a particularly high degree of accuracy.

The object is also reached with a computer program, a computer readable medium, a control unit, or a group of control units, or a vehicle. The control unit, or each control unit in the group of control units, may comprise a processor and a memory for processing data. The control unit, or each control unit in the group of control units, may comprise a computer adapted to run a program.

A further aspect of the invention provides improved vehicle controls by providing a fast and accurate subject vehicle state parameter estimation. The subject vehicle state parameter may be any suitable vehicle state parameter. For example, the subject vehicle state parameter may be the mass of the vehicle. Alternatively, the subject vehicle state parameter may be a road inclination measurement adjustment which is an adjustment of a measurement of an inclination of a road on which the vehicle is travelling. The aspect involves a computer implemented method for controlling a vehicle, said control being performed by use of a non-linear model representing dynamics of the vehicle, the non-linear model giving a relationship between a plurality of vehicle state parameters, the vehicle state parameters including a subject vehicle state parameter and one or more further state parameters, the method comprising obtaining a value of the subject vehicle state parameter, receiving a plurality of time sequential measured first values of one or more of the further state parameters, calculating a first plurality of time sequential values of the subject vehicle state parameter, including a first calculated subject vehicle state parameter value, using the plurality of measured first values of the one or more further state parameters, the non-linear model, and an extended Kalman filter with a first filter tuning, with the obtained subject vehicle state parameter value as a start value, receiving a plurality of time sequential measured second values of the one or more of the further state parameters, and calculating a second plurality of time sequential values of the subject vehicle state parameter, including a second calculated subject vehicle state parameter value, using the plurality of measured second values of the one or more further state parameters, the non-linear model, and an extended Kalman filter with a second filter tuning, with the first calculated subject vehicle state parameter value as a start value, wherein the second filter tuning is made less aggressive than the first filter tuning, the method further comprising using the second calculated subject vehicle state parameter value in the control of the vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
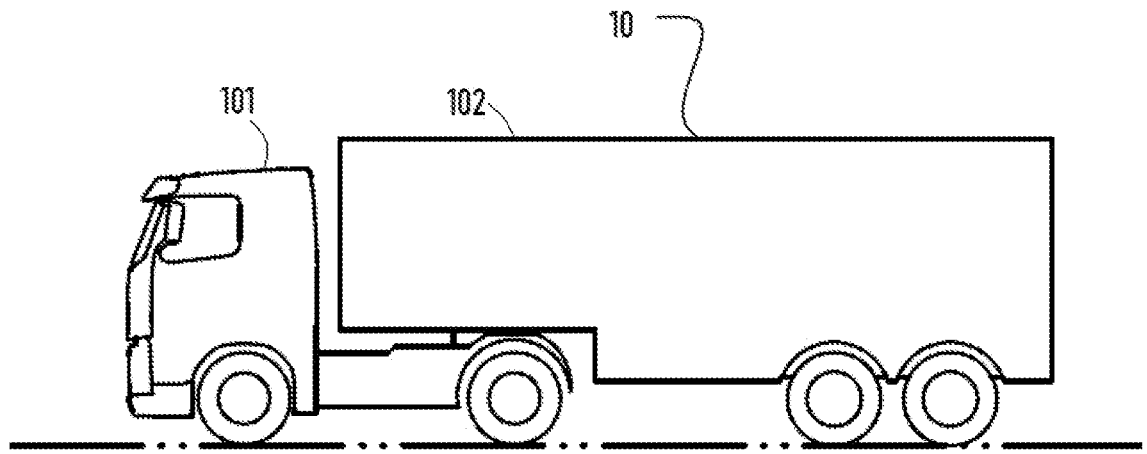
FIG. 1 is a sideview of a vehicle.

FIG. 1 shows a vehicle 10. In this example, the vehicle 10 is a truck. The vehicle comprises a tractor 101 and a semitrailer 102 connected to the tractor. It should be noted that the invention is equally applicable to other types of vehicles, such as cars, buses, dump trucks, and mining vehicles.

Figure 2:
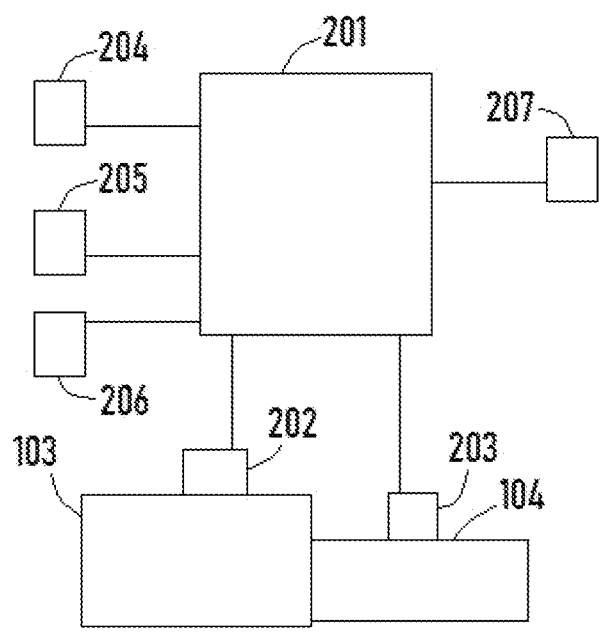
FIG. 2 is a block diagram depicting components of the vehicle in FIG. 1.

Reference is made also to FIG. 2. The tractor 101 includes a drivetrain. The drivetrain includes a propulsive device 103. Embodiments of the invention are applicable to a variety of propulsive devices. In this example, the propulsive device 103 is an internal combustion engine. In some embodiments, the propulsive device may include an electric motor. The propulsive device may be a hybrid arrangement with an engine and a motor.

The drivetrain further comprises a gearbox 104 arranged to receive mechanical power from the propulsive device 103. The gearbox 104 is arranged to deliver mechanical power to wheels of at least one wheel axle of the vehicle.

The vehicle further comprises service brakes (not shown).

The vehicle comprises a control system arranged to control functions of the vehicle, such as its propulsion, and braking. The control system comprises a group of control units. The control system comprises a central control unit 201. The central control unit 201 may be provided as a single physical unit, or as a plurality of physical units, arranged to communicate with each other. The central control unit 201 may be located in the tractor 101.

The central control unit 201 is arranged to communicate with a propulsive device control unit 202, arranged to control the propulsive device 103. The central control unit 201 is further arranged to communicate with a gearbox control unit 203, arranged to control the gearbox 104. The central control unit 201 is further arranged to communicate with a brake control system (not shown), arranged to control the service brakes of the vehicle.

The central control unit 201 is arranged to receive signals from a vehicle velocity sensor 204, arranged to measure the vehicle velocity. The vehicle velocity sensor may be arranged to measure the vehicle velocity by measuring the rotational speed of a wheel of the vehicle.

The central control unit 201 is further arranged to receive signals from a road inclination sensor 205, arranged to measure the longitudinal inclination of the vehicle.

The central control unit 201 is also arranged to receive signals from one or more air pressure sensors 206, arranged to measure the pressure in an air suspension system (not shown) of the vehicle. The axles of the tractor 101 may be provided with air suspension, but the trailer 102 may not be provided with an air suspension system.

The central control unit 201 is also arranged to receive signals from a trailer connection sensor 207 indicating whether or not a trailer 102 is connected to the tractor 101.

The vehicle may also comprise equipment for wireless communication (not shown). The central control unit 201 may be arranged to receive data, and to send data, via the communication equipment. Thereby, the central control unit may be arranged to communicate with a stationary control unit 201 located remotely from the vehicle.

Figure 3:
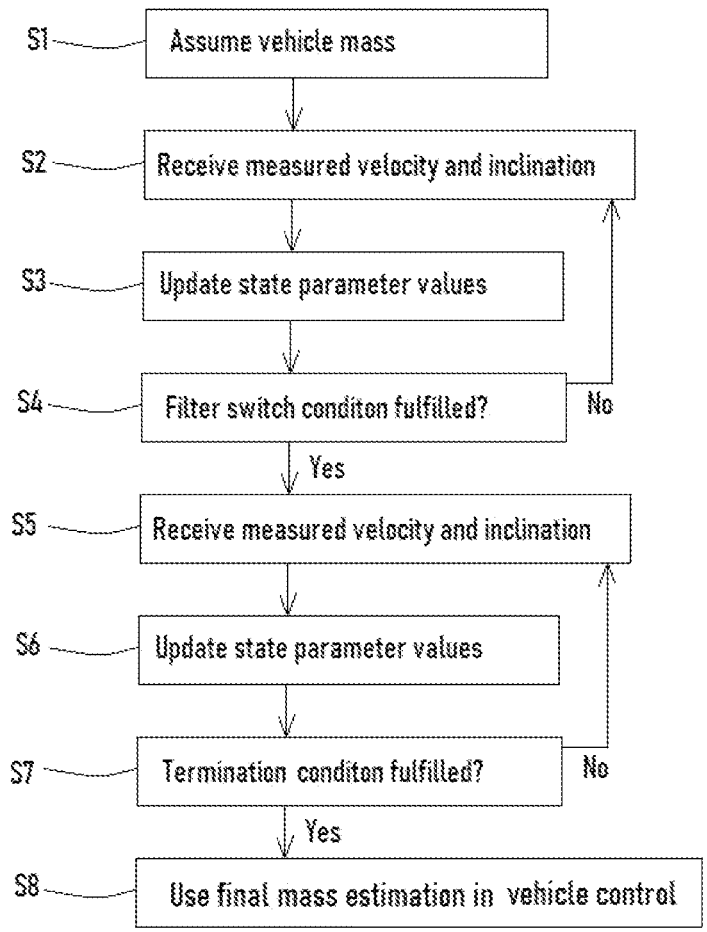
FIG. 3 is a diagram depicting steps in a method, according to an embodiment of the invention, for controlling the vehicle in FIG. 1.

Reference is also made to FIG. 3, depicting steps in a method according to an embodiment of the invention, for estimating the mass of the vehicle 10. For a commercial vehicle, the method may be used for example when transporting goods and/or persons, from one location to another location.

In operation, the vehicle is controlled by use of a non-linear model representing dynamics of the vehicle. The non-linear model may be stored accessible to the central control unit 201. The non-linear model gives a relationship between a plurality of vehicle state parameters. The vehicle state parameters include the mass m of the vehicle. The vehicle state parameters also include further state parameters in the form of the vehicle velocity v, a rolling resistance coefficient cr, an air resistance coefficient cair, and a road inclination α. Said relationship may be expressed with equation (1), (also given above):

$$m\frac{dv}{dt} = F - c_{atr}v^2 - mgc_r - mg\alpha \qquad (1)$$

where F is the total force on the wheels, g is the gravitational acceleration, and dv/dt is the vehicle acceleration. Thus, the non-linear model represents the longitudinal dynamics of the vehicle.

Figure 4:
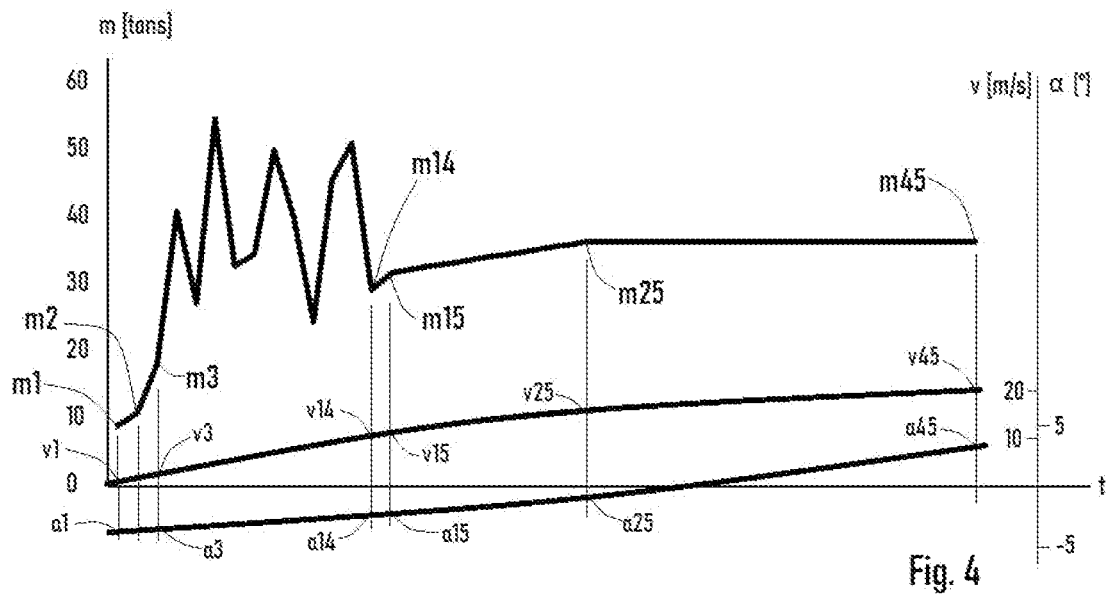
FIG. 4 is a diagram showing estimations of the vehicle mass, the vehicle velocity, and the road inclination, as functions of time.

Reference is made also to FIG. 4, showing vehicle velocity measurement, road inclination measurements, and vehicle mass estimations, as functions of time. FIG. 4 is given as an example only. The time interval shown in FIG. 4 may be any time interval, e.g. 3 second, or 30 seconds.

The method comprises assuming S1 a value m1 of the mass of the vehicle. For this, the air pressure sensor(s) 206 may be used. Where the axles of the tractor 101, but not the axles of the trailer 102, are provided with air suspension, the vehicle mass value may be assumed in dependence on the air pressure sensor signals, and an assumption on a longitudinal mass distribution of the vehicle. The vehicle mass distribution may provide, without giving absolute values, a distribution of parts of the total mass along the vehicle longitudinal direction. The vehicle mass distribution may depend on the configuration of the vehicle. Thus, an assumed vehicle mass distribution may be provided for the tractor 101 without the trailer 102, and another assumed vehicle mass distribution may be provided for the combination of the tractor 101 and the trailer 102. The assumed vehicle mass distributions may be stored accessible to the central control unit 201.

For the mass estimation, a discrete time domain is provided. I.e. time is divided into time steps of equal length. As the vehicle is moving, at each time step, a measured first value v1-v14 of the vehicle velocity, and a measured first value α1-α14 of the road inclination, are received S2. Using an extended Kalman filter with a first filter tuning, at each time step k+1, the state parameters from the preceding time step k are updated S3 by the following equations, (also given above):

$$v_{k+1} = v_k + T_g\left(\frac{1}{m_k}\left(F_k - c_{air_k}v_k^2\right) - gc_{r_k} - g(\alpha_k + \alpha_{b_k})\right) + w_1 \quad (1a)$$

$$m_{k+1} = m_k + w_2 \quad (1b)$$

$$c_{r_{k+1}} = c_{r_k} + w_3 \quad (1c)$$

$$c_{air_{k+1}} = c_{air_k} + w_4 \quad (1d)$$

$$\alpha_{b_{k+1}} = \alpha_{b_k} + w_5 \quad (1e)$$

Thereby, Ts is the sampling time, providing said time steps. In may be for example 20-1000 ms, e.g. 200 ms. Further, w1-w5 are state uncertainties for respective of the state parameters v, m, cr, cair, αb. αb is a road inclination measurement adjustment which is an adjustment of a measurement of the road inclination α. The road inclination measurement adjustment ab was discussed above.

The first filter tuning is dependent on a covariance of the state uncertainties w1-w5. Thereby, a first plurality of time sequential values m2-m14 of the vehicle mass is calculated, using the measured first values v1-v14, α1-α14 of the velocity and the road inclination, and the extended Kalman filter with the first filter tuning, with the assumed mass value m1 as a start value.

The non-linear model further comprises a measurement function which adjusts the measured first values v1-v14 of the velocity, based on a value of a measurement noise and a variance of the measurement noise. The function may be expressed with the following equation, (which is also given above):

$$y_{kv} = v_k + \mu_{kv} \quad (2a)$$

where μkv is the velocity measurement noise. The first filter tuning is dependent on the variance of the measurement noise μkv.

The method comprises determining S4, at each time step, whether or not a filter switch condition, described closer below, is fulfilled. If the filter switch condition is not fulfilled, the steps of receiving S2 measured first values v1-v14, α1-α14 of the vehicle velocity, and the road inclination, and updating S3 the state parameters, are repeated.

If the filter switch condition described below is fulfilled, the extended Kalman filter is changed to a second filter tuning. In the second filter tuning, the covariance of the state uncertainties w1-w5 is different from the covariance of the state uncertainties w1-w5 in the first filter tuning.

As the vehicle keeps moving, at each time step, a measured second value v15-v45 of the vehicle velocity, and a measured second value α15-α45 of the road inclination, are received S5. Using the extended Kalman filter with the second filter tuning, at each time step k+1, the state parameters from the preceding time step k are updated S6 by the equations 1a-1e above. Thereby, the state parameter values, including the mass value m14, the velocity value v14, and the road inclination value α14, from the last time step with the first filter tuning, are used as start values.

As with the use of the first filter tuning, the measurement function according to equation 2a above, adjusts the measured second values v15-v45 of the velocity, based on a value of a measurement noise and a variance of the measurement noise. In the second filter tuning, the variance of the measurement noise μkv is different from the variance of the measurement noise μkv in the first filter tuning.

As suggested above, by suitable adjustments of the covariance of the state uncertainties w1-w5, and the variance the measurement noise μkv, the second filter tuning is made less aggressive than the first filter tuning. Examples of how the filter may be adjusted were given above. As suggested, the aggressive filter tuning may give a relatively large degree of fluctuations of the mass estimation, but it may also get relatively close to the true mass value in a relatively short time. Thereby, an accurate estimation may be provided by the soft filter tuning giving a relatively small degree of fluctuations. Since the estimated values have been brought relatively close to the true value by the first filter tuning, the soft filter tuning may reach the true value in a relatively short length of time. Thereby, a fast and accurate vehicle mass estimation may be provided.

Figure 5:
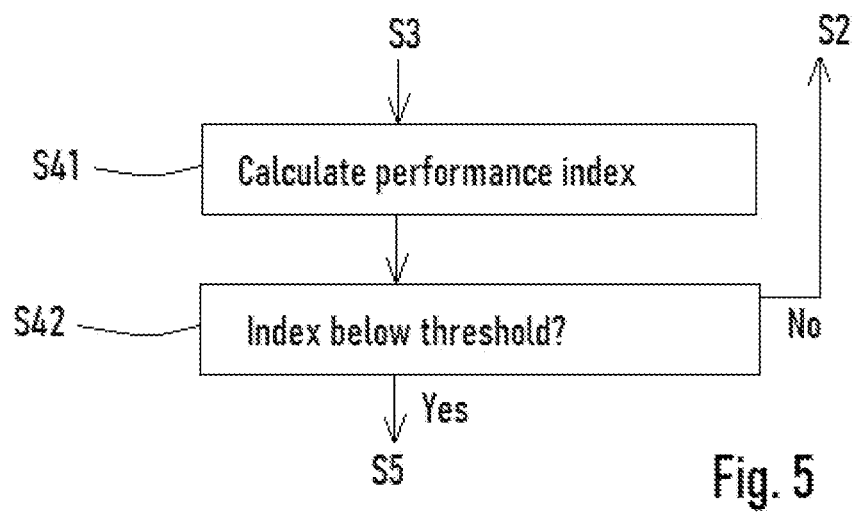
FIG. 5 is a diagram depicting partial steps in the method in FIG. 3.

Reference is made also to FIG. 5, showing partial steps in the filter switch condition test of step S4 in FIG. 3. The filter switch condition test comprises determining S41 a value of a calculation performance index. The index is indicative of the accuracy of some or all of the values m2-m14 in the first plurality of calculated values of the vehicle mass. As suggested above, the performance index may be expressed as a variance of the vehicle mass time sequential values according to the following equation:

$$PI(k) = \Sigma_{k=0}^{k0} \gamma e^{-\beta k} m(k) - m(k-1) \quad (3)$$

The performance index is dependent on a forgetting factor, represented by γ and β. As suggested, the forgetting factor allows for the performance index to ignore any rough estimation behavior in the beginning of the process with the first filter tuning.

The performance index value PIk is compared S42 to an index threshold value. If the performance index value PIk is not below the index threshold value, the steps of receiving S2 measured first values v1-v14, α1-α14 of the vehicle velocity, and the road inclination, and updating S3 the state parameters, are repeated, as exemplified above. If the performance index value PIk is below the index threshold value, the extended Kalman filter is changed to the second filter tuning, as exemplified above.

Reference is made again to FIG. 3. The method comprises determining S7 whether or not to terminate the mass estimation process. This can be done in alternative ways. For example, a group of the most recently determined vehicle mass values may be selected, and the variance of the vehicle mass values in this group may be determined. If this variance is below a threshold value, the mass estimation process may be terminated.

Upon terminating the mass estimation process, the latest mass value m45 is used in the control of the vehicle, e.g. in the control of the engine control unit 202, and/or the gearbox control unit 203.

Figure 6:
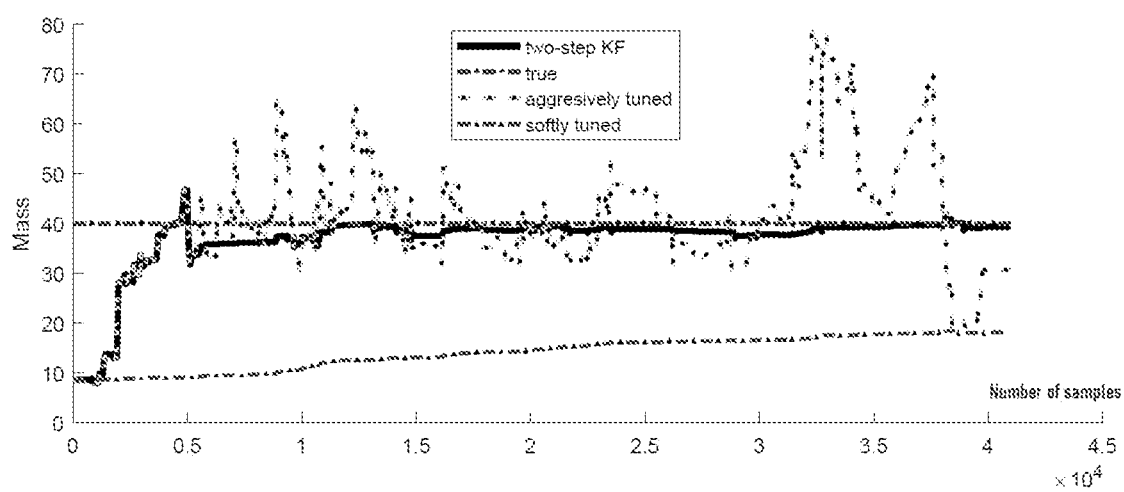
FIG. 6 is a diagram showing vehicle mass estimations as results of simulations.

The advantage of the invention is illustrated in FIG. 6. In FIG. 6, vehicle mass estimations according to a computer simulation based on real data from a test drive are shown. The test showed that using a method according to an embodiment of the invention, with a switch from an aggressive filter tuning to a soft filter tuning at around 0.5 seconds, a fast and accurate result is reached. As a comparison, if the mass estimations are left with the first, aggressive filter tuning, a high degree of fluctuations continue to appear. Also, if the mass estimations are done from the beginning with the second, soft filter tuning, the result is a slow movement towards the true mass value.

Figure 7:
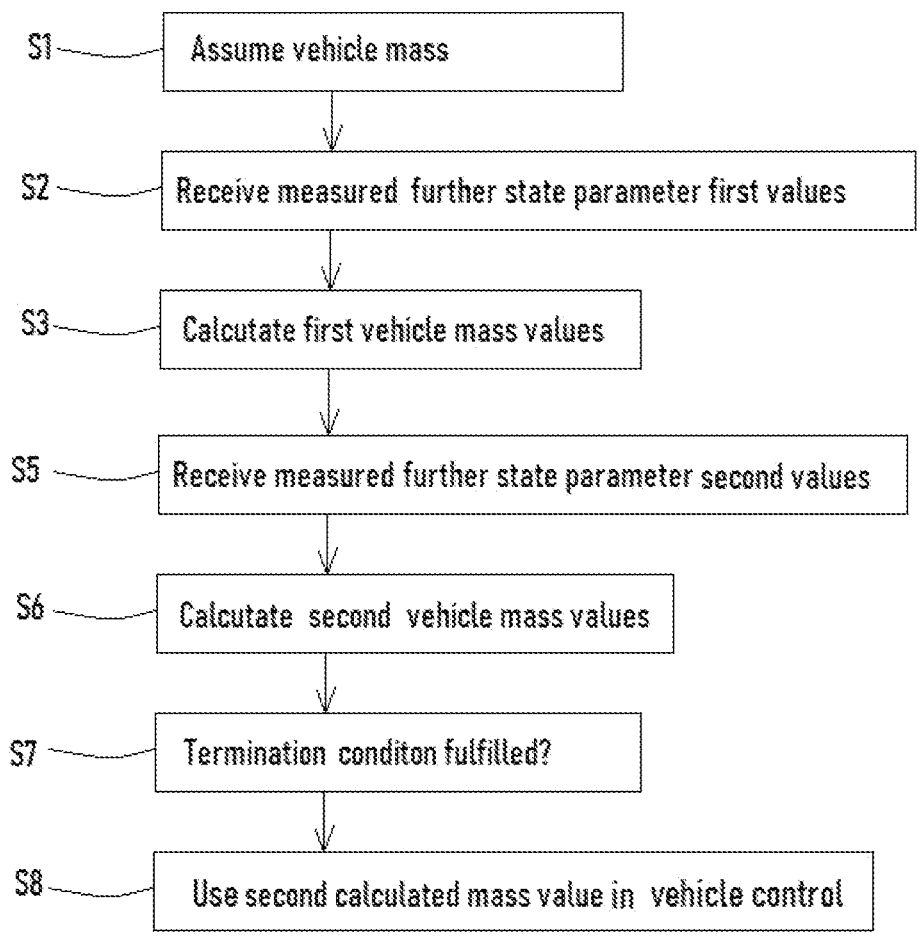
FIG. 7 is a diagram depicting steps in a method according to a more general embodiment of the invention.

Reference is made to FIG. 7, depicting steps in a method according to a more general embodiment of the invention, for controlling a vehicle. The control is performed by use of a non-linear model representing dynamics of the vehicle, the non-linear model giving a relationship between a plurality of vehicle state parameters. The vehicle state parameters including the mass of the vehicle and one or more further state parameters. The method comprises assuming S1 a value of the mass of the vehicle. The method further comprises receiving S2 measured further state parameter first values. The method further comprises calculating S3 a first plurality of time sequential vehicle mass values, including a first calculated mass value, using the measured further state parameter first values, the non-linear model, and an extended Kalman filter with a first filter tuning, with the assumed mass value m1 as a start value. The method further comprises receiving S5 measured further state parameter second values. The method further comprises calculating S6 a second plurality of time sequential vehicle mass values, including a second calculated mass value, using the measured further state parameter second values, the non-linear model, and an extended Kalman filter with a second filter tuning which is less aggressive than the first filter tuning, with the first calculated mass value as a start value. The method further comprises using S8 the second calculated mass value in the control of the vehicle.

Figure 8:
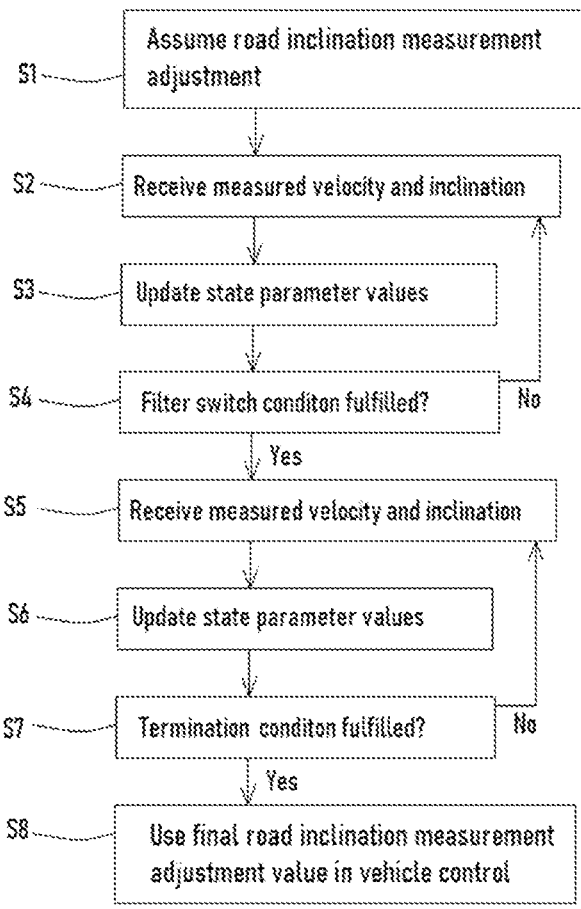
FIG. 8 is a diagram depicting steps in a method according to an embodiment of another aspect of invention.

Reference is made to FIG. 8, depicting steps in a method according to an embodiment of another aspect of invention, for estimating a road inclination measurement adjustment which is an adjustment of a measurement of the road inclination. The method has similarities to the method described with reference to FIG. 1-FIG. 6. Differences therefrom are understood from the following.

In the non-linear model, expressed in equation 1 above, the mass of the vehicle may, or may not be known. Where the vehicle mass is known, the method may be used to estimate the road inclination measurement adjustment. The measured road inclination $\alpha$ may be a measured vehicle state parameter in equation 1.

Figure 9:
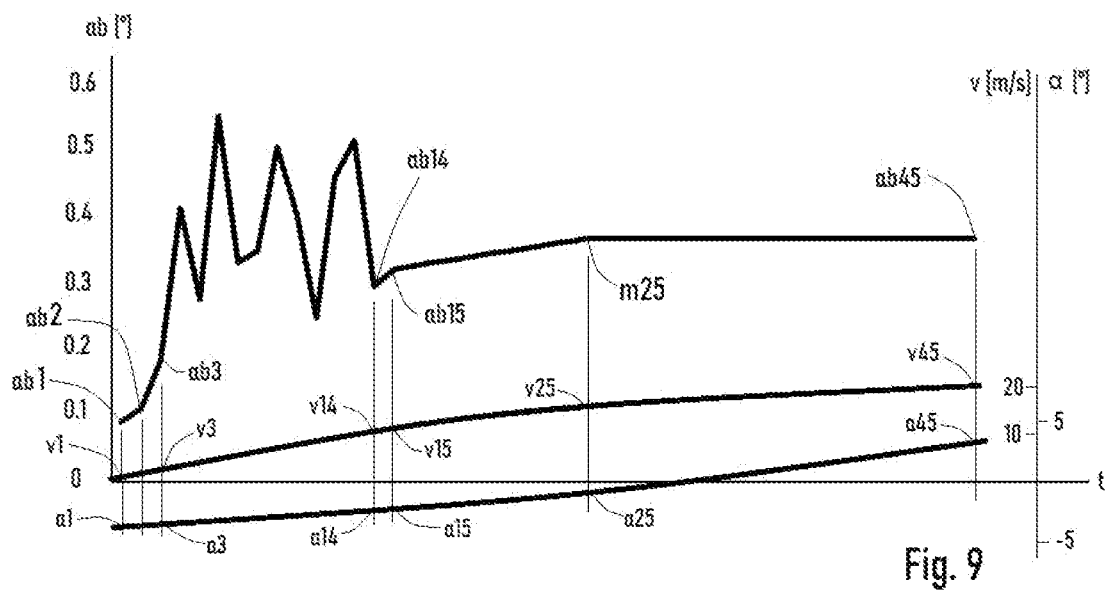
FIG. 9 is a diagram showing estimations of a road inclination measurement adjustment, the vehicle velocity, and the road inclination, as functions of time.

Reference is made also to FIG. 9, showing vehicle velocity measurement, road inclination measurements, and road inclination measurement adjustment estimations, as functions of time.

The method comprises assuming S1 a value $\alpha b1$ of the road inclination measurement adjustment. As in the method described with reference to FIG. 4, a discrete time domain is provided. As the vehicle is moving, at each time step, a measured first value v1-v14 of the vehicle velocity, and a measured first value $\alpha 1$-$\alpha 14$ of the road inclination, are received S2. Using an extended Kalman filter with a first filter tuning, and assuming that the vehicle mass is known, at each time step k+1, the state parameters from the preceding time step k are updated S3 by equations 1a, 1c, 1d, and 1e, given above. Thereby, the first filter tuning is dependent on a covariance of the state uncertainties w2-w5. Thereby, a first plurality of time sequential values $\alpha b2$-$\alpha b14$ of the road inclination measurement adjustment is calculated, using the measured first values v1-v14, $\alpha 1$-$\alpha 14$ of the velocity and the road inclination, and the extended Kalman filter with the first filter tuning, with the assumed road inclination measurement adjustment $\alpha b1$ as a start value.

As in the method described with reference to FIG. 1-FIG. 6, the non-linear model comprises a measurement function which adjusts the measured first values v1-v14 of the velocity, based on a value of a measurement noise and a variance of the measurement noise. The function may be expressed with equation 2a above.

As in the method described with reference to FIG. 1-FIG. 6, the method comprises determining S4, at each time step, whether or not a filter switch condition. This may be done in a way that is similar to what is done in the method described with reference to FIG. 1-FIG. 6. If the filter switch condition is not fulfilled, the steps of receiving S2 measured first values v1-v14, $\alpha 1$-$\alpha 14$ of the vehicle velocity, and the road inclination, and updating S3 the state parameters, are repeated.

If the filter switch condition described below is fulfilled, the extended Kalman filter is changed to a second filter tuning. In the second filter tuning, the covariance of the state uncertainties w2-w5 is different from the covariance of the state uncertainties w2-w5 in the first filter tuning. Also, in the second filter tuning, the variance of the measurement noise $\mu kv$ is different from the variance of the measurement noise $\mu kv$ in the first filter tuning.

As the vehicle keeps moving, at each time step, a measured second value v15-v45 of the vehicle velocity, and a measured second value $\alpha 15$-$\alpha 45$ of the road inclination, are received S5. Using the extended Kalman filter with the second filter tuning, at each time step k+1, the state parameters from the preceding time step k are updated S6 by the equations 1a, and 1c-1e above. Thereby, the state parameter values, including the road inclination measurement adjustment value $\alpha b14$, the velocity value v14, and the road inclination value $\alpha 14$, from the last time step with the first filter tuning, are used as start values.

As suggested above, by suitable adjustments of the covariance of the state uncertainties w2-w5, and the variance the measurement noise $\mu kv$, the second filter tuning is made less aggressive than the first filter tuning. The aggressive filter tuning may give a relatively large degree of fluctuations of the road inclination measurement adjustment estimation, but it may also get relatively close to the true mass value in a relatively short time. Thereby, an accurate estimation may be provided by the soft filter tuning giving a relatively small degree of fluctuations. Since the estimated values have been brought relatively close to the true value by the first filter tuning, the soft filter tuning may reach an accurate value of the road inclination measurement adjustment true in a relatively short length of time.

The method comprises determining S7 whether or not to terminate the road inclination measurement adjustment estimation process. This may be done in a way that is similar to what is done in the method described with reference to FIG. 1-FIG. 6.

Upon terminating the road inclination measurement adjustment estimation process, the latest value thereof αb45 is used in the control of the vehicle, e.g. in the control of the engine control unit 202, and/or the gearbox control unit 203.

It is to be understood that the present invention is not limited to the embodiments described above and illustrated in the drawings; rather, the skilled person will recognize that many changes and modifications may be made within the scope of the appended claims.

The invention claimed is:

1. A computer implemented method for controlling a vehicle, said control being performed by use of a non-linear model representing dynamics of the vehicle, the non-linear model giving a relationship between a plurality of vehicle state parameters, the plurality of vehicle state parameters including a mass of the vehicle and one or more further state parameters, the method comprising:
   obtaining a value of the mass of the vehicle,
   receiving a plurality of time sequential measured first values of one or more of the further state parameters,
   calculating a first plurality of time sequential values of the vehicle mass, including a first calculated mass value, using the plurality of measured first values of the one or more further state parameters, the non-linear model, and an extended Kalman filter with a first filter tuning, with the obtained mass value as a first start value,
   receiving a plurality of time sequential measured second values of the one or more of the further state parameters, and
   subsequently calculating a second plurality of time sequential values of the vehicle mass, including a second calculated mass value, using the plurality of measured second values of the one or more further state parameters, the non-linear model, and an extended Kalman filter with a second filter tuning that is subsequent to the first filter tuning, with the first calculated mass value as a second start value,
   wherein the second filter tuning is made less aggressive than the first filter tuning,
   the method further comprising using the second calculated mass value in the control of the vehicle, wherein the non-linear model represents longitudinal dynamics of the vehicle, the method comprising using the second estimated mass value in a longitudinal control of the vehicle.

2. The method according to claim 1, characterized in that the one or more further state parameters include one or more of a velocity of the vehicle, an air resistance coefficient, a rolling resistance coefficient, and an inclination of a road on which the vehicle is travelling.

3. The method according to claim 1, characterized in that the model comprises a state uncertainty for each of the plurality of state parameters, and a covariance of the state uncertainties, wherein making the second filter tuning less aggressive than the first filter tuning comprises making the state uncertainties covariance in the second filter tuning differ from the state uncertainties covariance in the first filter tuning.

4. The method according to claim 1, characterized in that the model comprises a measurement function which adjusts the measured first and second values of the one or more of the further state parameters in the respective first and second filter tunings, based on values of respective measurement noise and variances of the respective measurement noise.

5. The method according to claim 4, characterized in that making the second filter tuning less aggressive than the first filter tuning comprises making the variance of the measurement noise in the second tuning differ from the variance of the measurement noise in the first tuning.

6. The method according to claim 4, characterized in that the adjusted measured first and second values of the one or more of the further state parameters includes first and second values of an inclination of a road on which the vehicle is travelling, respectively.

7. The method according to claim 1, characterized by determining a value of a calculation performance index indicative of accuracy of one or more of the values in the first plurality of calculated values of the vehicle mass, and performing a change, from the use of the extended Kalman filter with the first filter tuning, to the use of the extended Kalman filter with the second tuning, in dependence on the calculation performance index value.

8. The method according to claim 7, characterized in that the performance index is based on a variance of a plurality of the values in the first plurality of calculated values of the vehicle mass.

9. The method according to claim 7, characterized by comparing the performance index value to an index threshold value, and performing the Kalman filter change in dependence on the comparison.

10. The method according to claim 7, characterized in that the dependence of the performance index value on a value in the first plurality of calculated values of the vehicle mass is dependent on an age of the respective value in the first plurality of calculated values.

11. The method according to claim 1, characterized in that the vehicle is a heavy duty vehicle.

12. A computer implemented method for controlling a vehicle, said control being performed by use of a non-linear model representing dynamics of the vehicle, the non-linear model giving a relationship between a plurality of vehicle state parameters, the plurality of vehicle state parameters including a road inclination measurement adjustment which is an adjustment of a measurement of an inclination of a road on which the vehicle is travelling, and one or more further state parameters, the method comprising:
   obtaining a value of the road inclination measurement adjustment,
   receiving a plurality of time sequential measured first values of one or more of the further state parameters,
   calculating a first plurality of time sequential values of the road inclination measurement adjustment, including a first calculated road inclination measurement adjustment value, using the plurality of measured first values of the one or more further state parameters, the non-linear model, and an extended Kalman filter with a first filter tuning, with the obtained road inclination measurement adjustment value as a first start value,
   receiving a plurality of time sequential measured second values of the one or more of the further state parameters, and
   subsequently calculating a second plurality of time sequential values of the road inclination measurement adjustment, including a second calculated road inclination measurement adjustment value, using the plurality of measured second values of the one or more further state parameters, the non-linear model, and an extended Kalman filter with a second filter tuning that is subsequent to the first filter tuning, with the first calculated road inclination measurement adjustment value as a second start value,
   wherein the second filter tuning is made less aggressive than the first filter tuning, the method further comprising using the second calculated road inclination measurement adjustment value in the control of the vehicle, wherein the non-linear model represents longitudinal dynamics of the vehicle, the method comprising using the second estimated mass value in a longitudinal control of the vehicle.

13. A non-transitory computer readable medium carrying a computer program comprising program code for performing the steps of claim 1 when said program code is run on a computer, or a group of computers.

14. A control unit, or a group of control units, configured to perform the steps of the method according to claim 1.

15. A vehicle comprising the control unit or the group of control units according to claim 14.

\* \* \* \* \*